United States Patent [19]
Sherwood

[11] 3,988,655
[45] Oct. 26, 1976

[54] APPARATUS TO CONTROL THE DIRECTION OF MOVEMENT OF A MECHANISM

[76] Inventor: Henry A. Sherwood, 30 North Road, Short Hills, N.J. 07078

[22] Filed: Oct. 21, 1974

[21] Appl. No.: 516,535

[52] U.S. Cl. .............................. 318/257; 318/107
[51] Int. Cl.² .......................................... H02P 7/80
[58] Field of Search ..................... 318/105–110, 318/112, 257

[56] References Cited
UNITED STATES PATENTS

| | | | |
|---|---|---|---|
| 2,872,879 | 2/1959 | Vierling | 318/107 X |
| 3,024,739 | 3/1962 | Smith et al. | 318/107 X |
| 3,050,672 | 8/1962 | Alexanderson | 318/257 |
| 3,324,366 | 6/1967 | Ryan | 318/110 X |

Primary Examiner—Robert K. Schaefer
Assistant Examiner—W. E. Duncanson, Jr.
Attorney, Agent, or Firm—Arthur A. March

[57] ABSTRACT

Apparatus to control the direction of movement of a mechanism over a surface. The surface is provided with a plurality of substantially parallel strips of conductive material alternately connected to opposite terminals of a source of current supply. The mechanism has a plurality of conductive discs or wipers so disposed that at least two of the wipers contact a pair of the conductors which are each connected to oppositely disposed terminals. The mechanism also has driving means such as wheels for movement and a motor engaged through the wipers for propelling the wheels over the surface. The mechanism can move forwardly, rearwardly, laterally or in a zig-zag motion. Control means are provided between the motor and the driving means so that the direction of movement may be varied in response to the voltage across the alternate conductors engaged by the wipers.

29 Claims, 11 Drawing Figures

APPARATUS TO CONTROL THE DIRECTION OF MOVEMENT OF A MECHANISM

BACKGROUND OF THE INVENTION

Heretofore there have been innumerable proposals for the control of the movement of bodies or mechanisms of a variety of shapes and sized by either wire connection to these mechanisms or by wireless signals and controls. However, there is no operative disclosure of an arrangement whereby the body or mechanism is freely moving and can be controlled to move to a forward straight, forward right, forward left, backward straight and backward right and backward left direction by only two wires from a control to a supporting surface.

Although this invention is not limited in its scope to the movements of large or small toy vehicles, such forms perhaps are the first examples of the art concerned with the directional movement of various bodies or mechanisms.

For example, in small scale racing cars, the electric power to drive them along a predetermined path may be provided through metal rails in separate lanes extended along the entire length and width of the racing track. Generally, these metal rails are arranged in a plurality of different sections which must be previously assembled in order to form a particular racing track layout. Each car carries a pair of metal assemblies or metal pick-up terminals electrically connected to a motor carried by each car.

Furthermore, a power pack or transformer is also provided with this type of vehicle, whereas the electric power source as well as individual control car means are electrically connected thereto. The speed of the car is controlled by means which are provided in individual handles. For each of said handles there is a movable rheostat to modify in a conventional way the speed of the electric motor and therefore, the moving conditions of each car.

A very important drawback in these racing cars is that they can move only in one direction and there are pins riding in predetermined slots.

It is also well known that amusement parks generally are provided with an attraction in the form of a drivable vehicle wherein the electric power supply is provided through an overhead metal grid. The current necessary to drive each car is obtained by the contact of a vertical conductor extending from each car to the metal grid and being electrically connected to a motor in each car. This is a three dimensional expensive arrangement.

Other attmepts to provide for multi-directional movement of vehicles or other mechanisms in a safe, efficient and relatively inexpensive manner have been unsuccessful. There is therefore no provision in the toy game or other arts of an apparatus which can be moved in a plurality of vaired directions as desired and with the exercise of only one control and a two dimensional current carrying surface.

OBJECTS OF THE INVENTION

It is, therefore, the principal object of the present invention to provide a complete apparatus for controlling the direction of travel of a mechanims over a surface in a plurality of desired directions.

It is a further object of the invention to provide an apparatus as above characterized utilizing a complete control by voltage changes only.

It is still a further object of the invention to utilize a two dimensional surface to supply current for free moving mechanism in place of the three dimensional expensive structure heretofore used.

It is another object of the invention to provide an apparatus as characterized above which is safe, reliable and relatively inexpensive to produce.

SUMMARY OF THE INVENTION

These objects set forth are attained according to the present invention by an apparatus for controlling the direction of travel of a mechanism over a surface having a plurality of parallel conductors on the surface alternately connected to opposite terminals of a current supply source. A plurality of conductive discs or wipers are provided on the mechanism positioned such that at least two of the wipers contact a pair of said conductors connected to the opposite terminals. A motor is provided on the mechanism which is energizable through the wipers for propelling the body or mechanisms along the surface. Means are provided for controlling the voltage across alternate conductors. The mechanism is also provided with wheel means which are in contact with the surface. The wheels are driven by means which are rotated by the motor and are controllable to freely vary the direction of movement of the body on the surface in response to the voltage across alternate conductors.

This control means, as one of the many features of the present invention, includes a centrifugal device which is actuated by the motor to control the position of a member which engages the wheel means, thus translating voltage changes into mechanical motion.

The discs or wipers are floatingly carried on the body for picking up electric power to drive the body in different directions and conditions. Three of the four wipers are arranged in an equilateral triangle and are located at the vertexes of the triangle with the fourth wiper at the center thereof. The wipers each have a diameter less than the spacing between two adjacent conductors and the distance between the neighboring discs is less than the spacing so that two of the wipers are always in contact with adjacent conductors.

DETAILED DESCRIPTION OF THE INVENTION

It is to be understood that the following description is provided to faciliate an understanding of the invention through an illustrative form thereof. The form of the mechanism and the circuitry illustrated as well as other specific details is not in any way intended to limit the scope of the invention.

Figure 1:
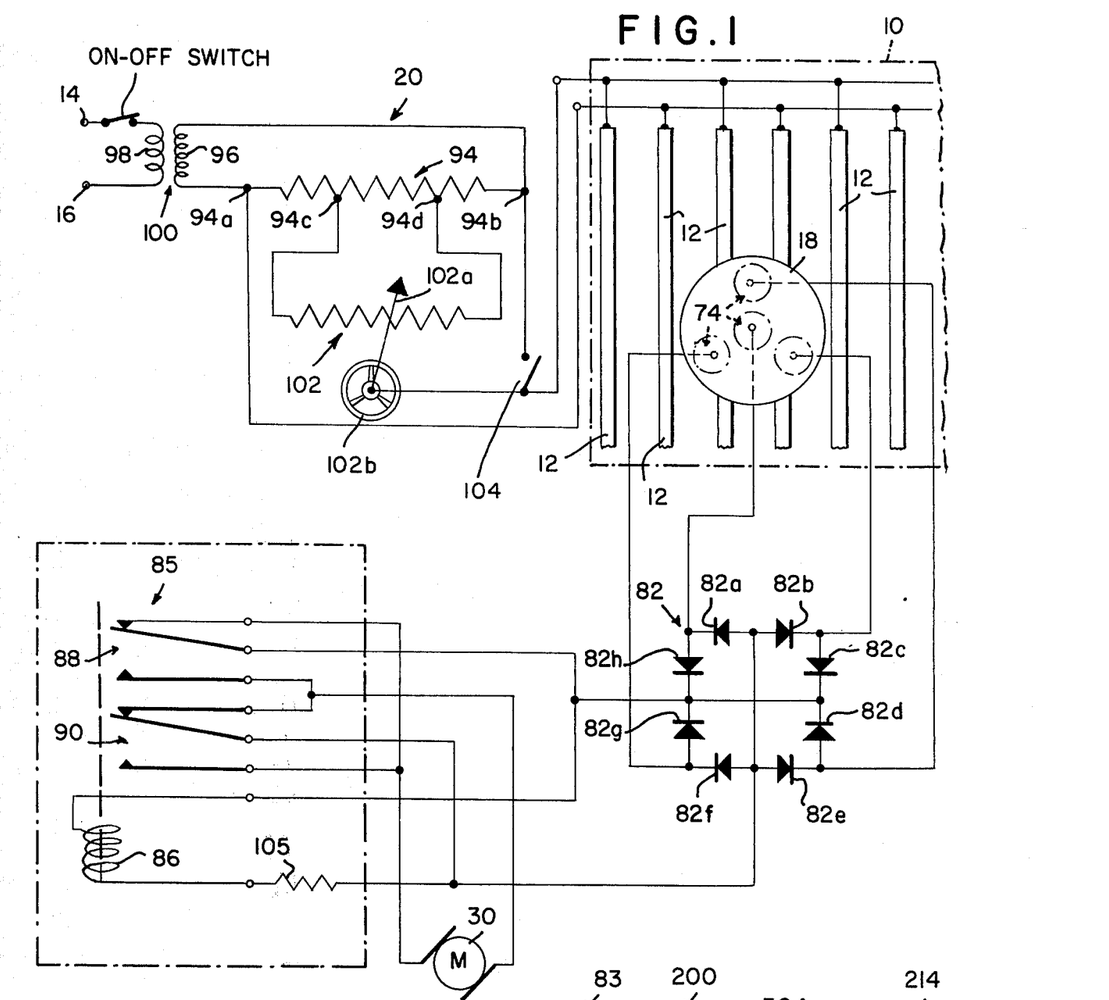
FIG. 1 is a schematic of the surface and of an example of the electrical circuitry utilizable for the apparatus of the present invention.

Referring to the drawings, FIG. 1 shows an embodiment of the invention which comprises a surface of support 10 having a plurality of parallel conductors 12 adapted to be electrically alternately connected to opposite terminals on the secondary of transformer 100.

Figures 3, 4, 5:
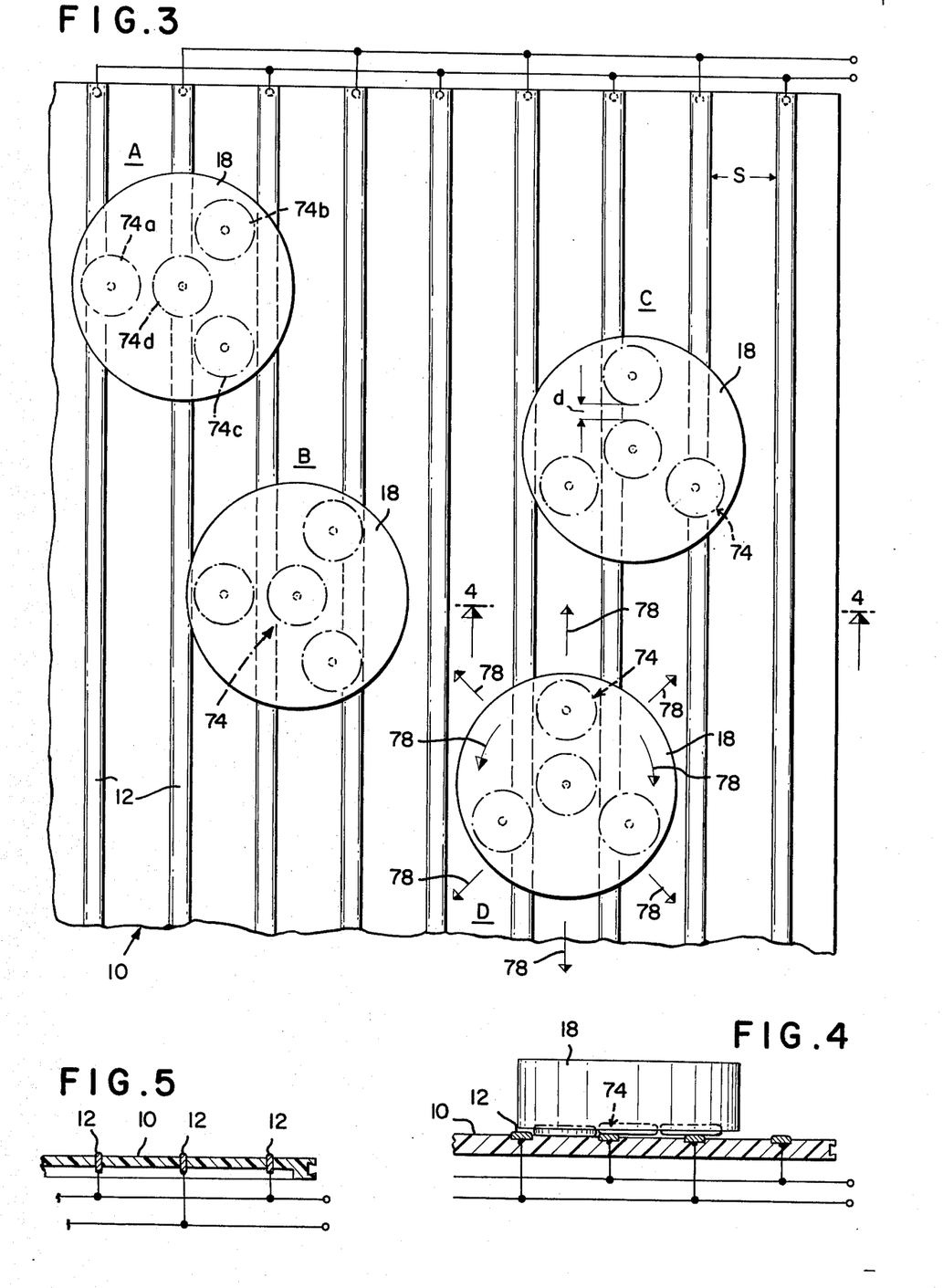
FIG. 3 is a partially broken top plan view of a surface of the conductor discs carried by the mechanism of the present invention in position on the surface.
FIG. 4 is a sectional view taken along lines 4—4 of FIG. 3.
FIG. 5 is a sectional view of the surface of the present invention showing the conductors embedded therein in accordance with one specific embodiment.

The conductors may be mounted on the top surface 10 of the support, or they may be embedded in the support as illustrated in FIG. 5. The invention contemplates utilization of cost-saving techniques in that the plurality of parallel conductors may be produced in accordance with well-known techniques such as those used in printed circuitry or strip inserts.

Figure 6:
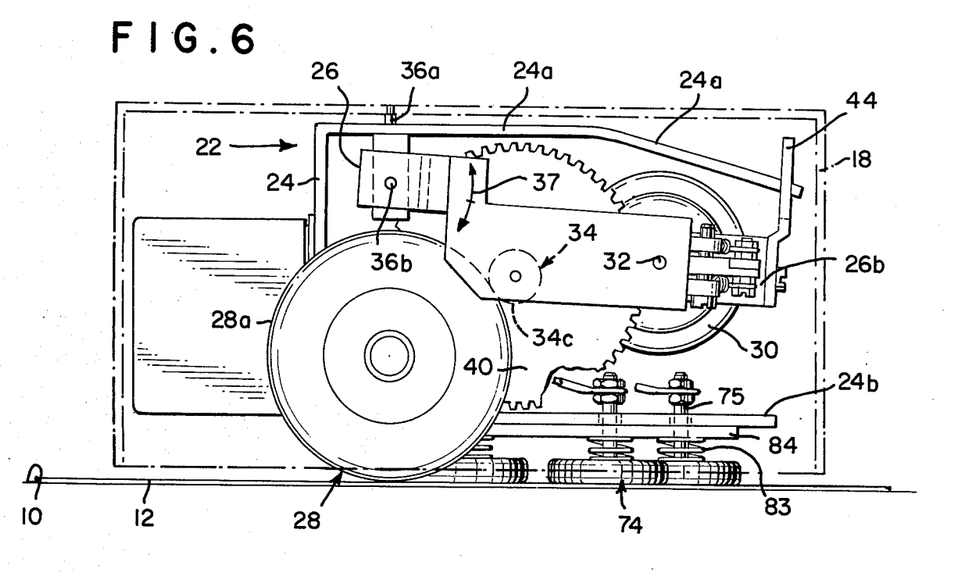
FIG. 6 is a side elevational view partly in section of the mechanism of the present invention showing the vehicular form.

A vehicle or other similar mechanism 18 is disposed on the surface 10. Control means 20 are operatively electrically connected between the current supply source and the conductors 12. As shown in FIG. 6, the vehicle mechanism 18 comprises a chassis 22 having a stationary frame 24 and a floating supporting frame 26. A pair of rotatable wheels 28 are independently mounted on both sides of the stationary frame 24. The stationary frame 24 is provided with an upper portion 24a and a lower portion 24b for purposes hereafter set forth.

Figure 7:
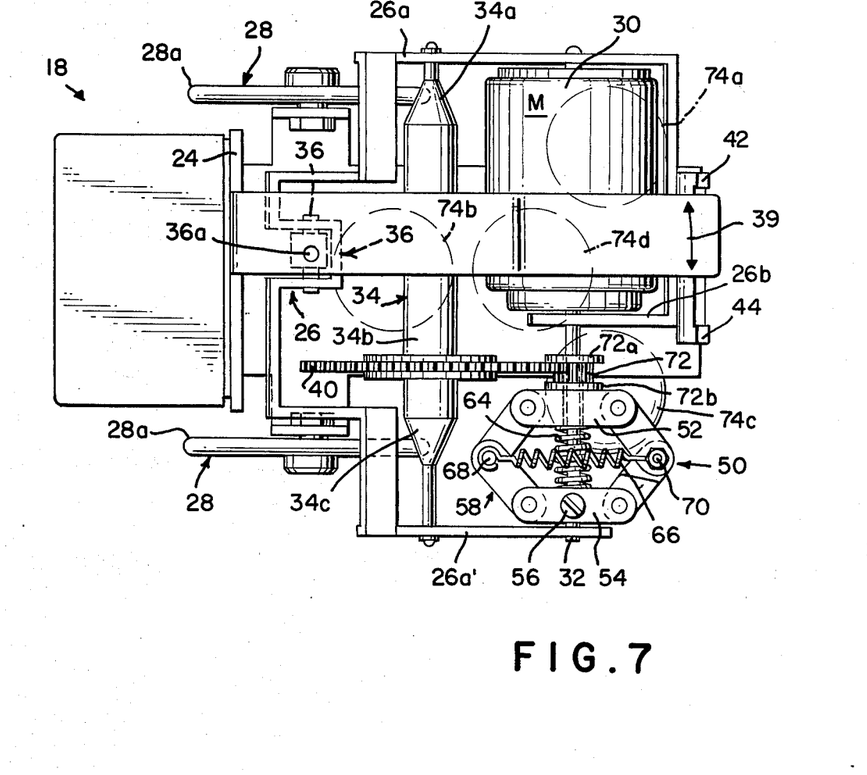
FIG. 7 is a top plan view partly in section of the vehicular mechanism of the present invention.

The floating supporting frame 26 is pivotally mounted at 36a to the stationary frame 24 through any conventional supporting means and comprises a pair of arms 26a and 26a' spaced apart from each other and an auxiliary supporting arm 26b, as shown in FIGS. 6 and 7. An electric D-C motor 30 is supported between arms 26a and 26b to drive a motor drive shaft 32 extending across arms 26b and arm 26a'.

A driving shaft 34 is provided with oppositely converging conical surfaces 34a, 34c and a rod 34b (see FIG. 7). The shaft is rotatably supported across the floating supporting frame 26 between arms 26a and 26a' thereof. The driving shaft 34 carries a driven gear 40 mounted to function as hereinafter set forth.

The floating supporting frame 26 is connected to stationary frame 24 by means of a universal joint 36 and is arranged above the rotatable wheels 28 so that the conical portion of the driving shaft 34 will be in frictional engagement with the periphery 28a of said wheels. Furthermore, the floating frame 26 will pivotably move about shaft 36a in the direction indicated by arrow 37 and about shaft 36b in the direction indicated by arrow 39 as will be described in detail in connection with the description of FIG. 7. The lateral shifting movement of the floating supporting frame 26 is limited by a pair of stops 42, 44 spaced apart from each other, which are provided on the floating supporting frame 26 projecting above the overhead portion 24a of the stationary frame 24.

Figure 10:
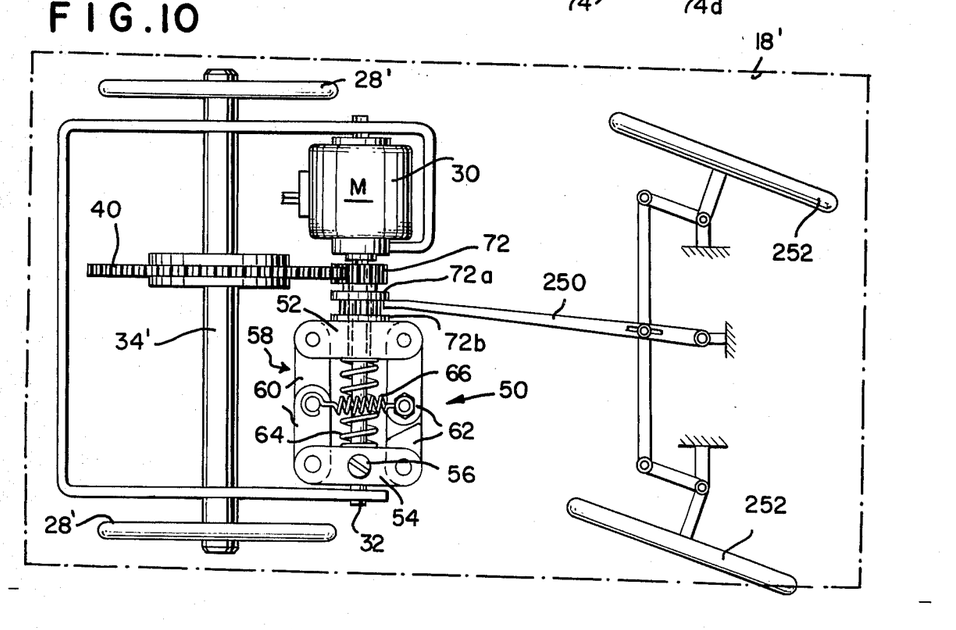
FIG. 10 is a top plan partially diagramatic view of another embodiment of the present invention.

Referring to FIG. 7 and FIG. 10, it will be seen that a centrifugal device or governor 50 is provided at one end of the motor drive shaft 32. FIG. 10 shows the device 50 in an inoperative position while FIG. 7 shows the device 50 in an operative position.

In FIG. 10, the centrifugal device or governor 50 comprises a block or movable member 52 slidably arranged on the motor drive shaft 32 and a block or stationary member 54 fixed to one end of the shaft 32 by means such as a screw 56. As may be readily seen in FIGS. 7 and 10, the members 52 and 54 are operatively connected to each other through linkage means 58 which comprises two pairs of link levers 60–62 arranged at both sides of the motor drive shaft 32. These are articulated to members 52, 54 respectively for axially shifting the member 52 towards member 54 upon rotation of the shaft 32. A compression spring 64 is provided between the members 52, 54 maintaining both apart from each other in the position of the governor or centrifugal device 50 as shown in FIG. 10.

A traction spring 66 is connected across the fulcrum points 68, 70 of the linkage means 58 so that spring 66 will bring the link levers 60, 62 together from the position illustrated in FIG. 7 to that position illustrated in FIG. 10 and thus define a straight line parallel to the motor drive shaft 32. As shown in FIG. 7 the movable member or block 52 carries a gear sleeve 72 which constitutes a drive power take-off for driving shaft 34 in opposite directions when the motor 30 is energized. The gear sleeve 72 has a pair of annular flanges 72a and 72b so that a portion of the driven gear 40 is arranged between said flanges. The gear 40 is being operatively engageable with gear sleeve 72 to drive wheels 28 along the surface 12 by means of the driving shaft 34.

Figure 8:
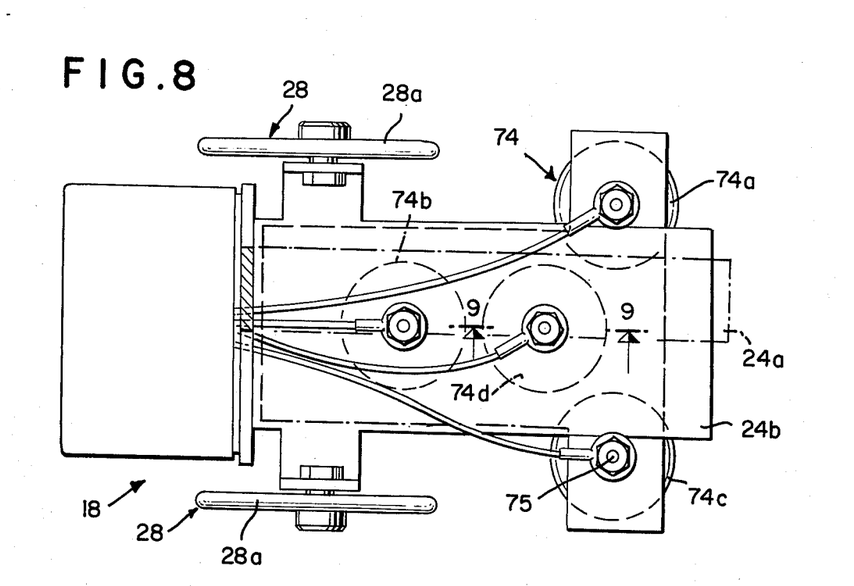
FIG. 8 is a top plan view of the vehicular mechanism showing the conductor discs or wipers and their mounting on the vehicular mechanism.

FIG. 8 shows, for illustrative purposes, the vehicular mechanism 18 which preferably carries four wipers or metal discs 74 so arranged that three of the discs 74a, 74b, 74c are located at the vertexes of a defined equilateral triangle and the other disc 74d is at the center of the triangle. These four discs 74 constitute the novel planar electric power pick up arrangement of the present invention provided on said mechanism 18, to energize the motor 30 and, consequently, to operate the centrifugal device 50. The devices 50, 40 and 34, in turn, will drive wheels 28 along the surface 10 in different directions such as shown for instance by the arrows 78 illustrated in FIG. 3 wherein the mechanism 18 is illustrated in four different positions A, B, C and D on the surface 10.

Figure 9:
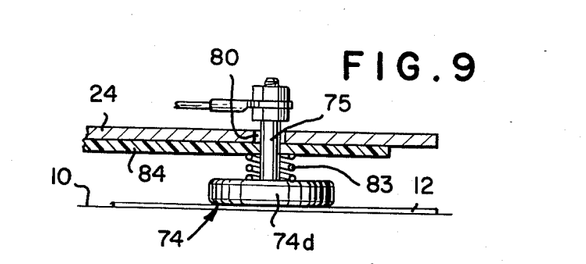
FIG. 9 is a sectional view taken along lines 9—9 of FIG. 8.

Moreover, each disc 74 has an outwardly extending perpendicular bar shaft portion 75 slidably received in a corresponding perforation 80 provided in the stationary frame 24 and substantially protruding above the upper face of said frame (See FIG. 9). The free end of the shaft 75 carries an electrical terminal which is operatively electrically connected to a bridge type rectifier 82 between the motor 30 and the discs 74 and a compression spring 83 is arranged between the insulating plate 84 and each disc 74 to ensure a good electrical contact between said discs and conductors 12.

The stationary and floating supporting members can be produced from any suitable plastic material. However, if they are manufactured of metal, a convenient such insulating plate 84 may be interposed between the stationary frame 24 and spring 83 to avoid any short circuits.

It is most noteworthy that each disc 74, as shown in FIG. 3, has a diameter which is slightly less than the spacing S between two adjacent conductors 12 and that the distance between adjacent discs is less than the spacing S. Using this novel and unique arrangement there will always be at least two discs 74 in sliding electrical contact with adjacent conductors having different polarities. Thus, for instance, in the position A illustrated in FIG. 3, discs 74a and 74d are in engagement with conductors of different polarities. Simultaneously discs 74b and 74c will remain without touching any third conductor. This arrangement is maintained at any position of any disc during any movement of the mechanism.

The wiring diagram of FIG. 1 shows an illustrative example of means for controlling the position of the mechanism 18 on the surface 10. It will also be apparent that the bridge type rectifier or twin bridge 82 is formed by diodes 82a through 82h connected between the power pick-up arrangement 74 and the motor 30 through a reversible relay having a coil 86 electrically connected across said bridge type rectifier 82 and has contacts 88–90 in circuit with said motor 30 for reversing the polarity thereof.

The apparatus, moreover, comprises means for controlling the working voltage of the motor 30 in the form of a load resistor 94 connected across the secondary coil 96 of a power transformer 100, and a potentiometer 102 connected across the load resistor 94 between contacts 94c and 94d. There is a predetermined amount of voltage when energized. To vary the speed of operations of the motor 30 a variable voltage is obtained by regulation of the slider 102a along potentiometer 102. With the potentiometer 102 it is thus possible to obtain "infinitely variable speed controls". The relay arrangement 86 of the present invention makes it possible to reverse the direction of rotation of the motor 30 in the following manner: A calibrating resistance 105 is provided in series with the relay coil 86, and thus the normal voltage range (approximately 4–6 volts) for the mechanism will not move the relay. Switch 104 when momentarily closed, will short circuit the resistor arrangement 94 and the potentiometer 102 allowing full voltage (approximately 10 volts) into the apparatus, thus pulling the relay to reverse the polarity. The relay remains energized and the mechanism moves backward until the power supply is interrupted. Thereafter it is possible to again begin a forward movement or any movement as desired; therefore movement into reverse is accomplished very simply and efficiently by the concept of the present invention. Through the adjustment of the slider 102a, the speed of the motor 30 is changed to vary the relative movement in reciprocation and rotation of the centrifugal device 50 to thereby shift the position of the driving shaft 34 whereby the driving shaft 34 will bring different diameters thereof into frictional engagement with the rotatable wheels 28, and can thereby infinitely vary each wheel's rotation. Therefore, the movement of the mechanism 18 upon the surface 10 can be controlled according to the operator's desires.

Figure 11:
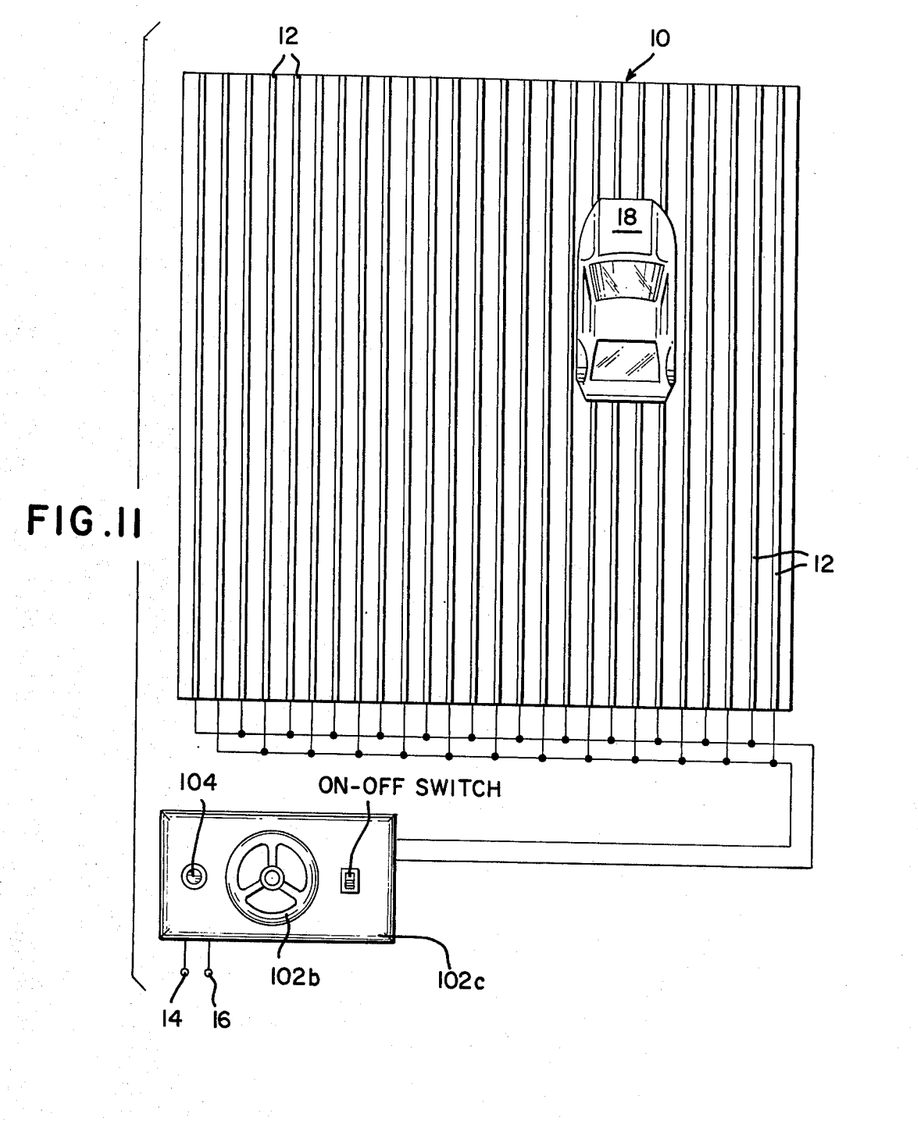
FIG. 11 is a top plan view of the apparatus of the present invention in assembled condition.

The potentiometer 102 is operated by a control wheel 102b operatively connected thereon, which may be mounted in an outside control box 102c such as it is illustrated in FIG. 11. It is evident that the power supply source required to drive this system may be A-C or D-C currents in accordance with the type of application used.

Figure 2:
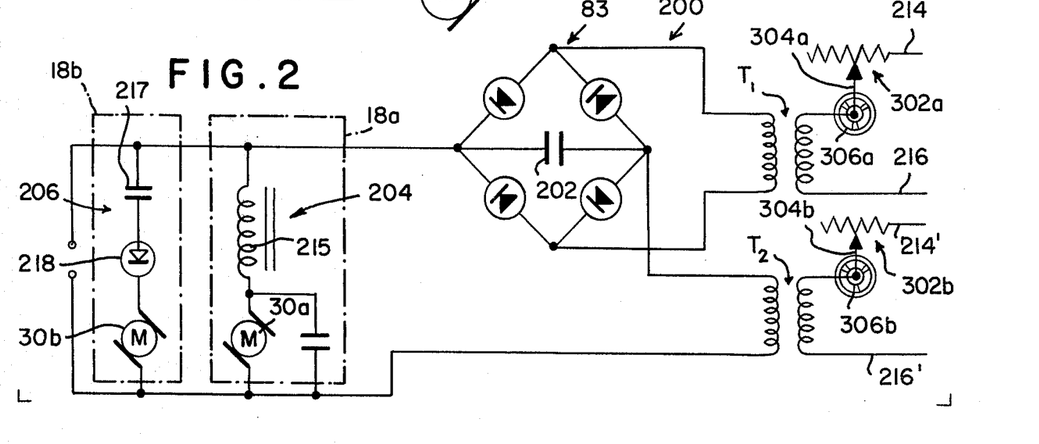
FIG. 2 is a schematic of an example of the electrical circuitry utilizable for a different embodiment of the apparatus of the present invention.

FIG. 8 shows the rotatable wheels 28 independently mounted on the stationary frame 24, while FIG. 10 shows a different construction of the vehicular mechanism 18 wherein the driving wheels 28' are mounted on a shaft 34' provided with a driven gear 40 in engagement with a drive gear 72. A control 250 is operatively connected between the centrifugal device 50 and a pair of steerable front wheels 252. With this arrangement, it is possible to control the movement of the mechanism 18' upon the surface in another and different manner as hereinafter set forth. FIG. 2 illustrates a schematic wiring diagram 200, corresponding to the alternative embodiment of the present invention.

As will be seen on the left portion of FIG. 2, instead of one mechanism 18 to be moved upon the surface, there are two mechanisms 18a and 18b. The system for controlling the position and movement of the mechanism upon the surface 10 operates substantially in the same way as the system of FIG. 1 except for the following distinguishing features:

a. The power required to drive the bodies 18a and 18b is provided by four input wires or leads 214, 216, 214', 216' connected to an A-C current supply source (not shown).

b. The working voltage of the system is stepped down by two low voltage power transformers $T_1$ and $T_2$.

c. Superimposed A-C and D-C sub circuits are formed by a bridge rectifier 83, a capacitor 202 and a transformer $T_2$.

d. A-C and D-C currents are provided to drive the bodies 18a and 18b, repsectively, upon the table 10.

e. A-C and D-C blocking networks 204, 206 are provided on car or bodies 18a–18b respectively with their individual motors 30a, 30b. These D-C motors constitute the power transmitting means for driving the same along the table 10.

The variable working voltage required to drive both cars or bodies 18a and 18b is obtained by a pair of rheostats 302a and 302b in series with the primary of the power transformers $T_1$ and $T_2$ respectively.

The rheostats 302a and 302b may be mounted in an outside control box (not shown) similar to the box 102c illustrated in FIG. 11. The variable positions of the corresponding sliders 304a–304b may be controlled by suitable driving control wheels 306a–306b conveniently arranged in a remote control box.

Superimposed A-C and D-C sub circuits are established by transformers $T_1$ and $T_2$ and the bridge rectifier 83. Thus, for instance, a D-C current will flow through circuit 204 to supply the required energy to drive the motor 30a. simultaneously, an A-C current will flow through current 206 to supply the required energy to drive the motor 30b.

A choke 215 provided in the blocking network 204 of the mechanism 18a will permit the passage of a D-C current and prevent the passage of the A-C current. The capacitor 217 provided in the blocking network 206 of the mechanism 18b, will not permit the passage of a D-C current to the motor 30b. A diode 218 is interposed between the motor 30b and the capacitor 217 to have a D-C current supply for the motor 30b.

In operation, as it is shown in FIGS. 1 and 11, the direction of travel of the mechanism 18 is controllable by the operator's desires to drive the car in a plurality of different conditions or directions such as; start, stop, forward straight, forward right, forward left, backward straight, backward right and backward left. The versatility of the changes in the directions is obtained by changing the position of the potentiometer 102 through the control wheel 102b as in FIG. 1 or by adjusting the position of the rheostats through control wheels 306a and 306b as in FIG. 2. Thus, the working voltage required to drive motor 30 can be adjusted for instance, between 4 to 6 volts. The rotation speed of the motor 30 will increase or decrease in accordance with the voltage supplied and therefore, the centrifugal device or governor 50 will operate the driving shaft 34 via the gears 40 and 72.

Depending upon the position of the driving shaft 34 on the wheels 28 and in view of the centrifugal force which appears in the device 50, the operator will be able to drive the car 18 in at least all the different directions mentioned above. Thus for instance, if both wheels 28 are in frictional engagement with surfaces of the driving shaft 34 having equal diameter, the vehicular mechanism will move in a straight forward or backward direction depending upon the direction of rotation of the motor 30. Such condition is illustrated in FIG. 7 wherein the periphery 28a of the wheels 28 are in contact with the surfaces 34a–34c having same diameter.

The normal voltage is, for example, 4 to 6 volts. However, when the switch 104 is momentarily closed, potentiometer 102 and the resistor 94 is shorted and full voltage (about 10 volts) goes through the apparatus to the relay 86. The polarity of the motor 30 will change so that the direction of rotation of the motor drive shaft 32 will also change accordingly. This reverse motion in the direction of rotation of the shaft 32 originates the different opposite driving conditions, while the turning rotation of the car 18 to the right or to the left will be controlled by the centrifugal device 50 through the potentiometer 102 or by the rheostat 302. FIG. 11 shows the on-off switch and the reverse switch 104.

Although my invention has been described in its preferred forms with particularity, it is understood that the description has been made only by way of example and that numerous changes in details of the particular circuitry and structure as well as the combination and arrangements of parts may be revised without departing from the spirit and scope of the invention as hereinafter claimed.

I claim:

1. An apparatus for controlling the direction of movement of a mechanism on a surface comprising:
   a plurality of substantially parallel conductors on said surface alternately connected to opposite terminals for connection to a current supply source;
   a plurality of wipers on said mechanism, at least two of said wipers being in contact with a pair of said conductors connected to said opposite terminals;
   rotation means on said mechanism in engagement with said surface; and
   means energizable through said wipers to propel said mechanism across the surface, said energizable means comprising a motor and including a control means on said mechanism between said motor and said rotation means for operating said rotation means to vary the direction of movement of said mechanism in response to the voltage across alternate conductors.

2. The apparatus of claim 1 including means for controlling the voltage across said alternating conductors.

3. The apparatus of claim 2, wherein said means for controlling said voltage comprises a load resistor and a potentiometer connected between said load resistor and said conductors.

4. The apparatus of claim 1, wherein said control means include a centrifugal device driven by said motor, and a control member engaging said rotation means and connected to said device.

5. The apparatus in claim 4, wherein said rotation means are differentially rotatable wheels and said control member is a driving shaft having oppositely converging conical surfaces in contact with said wheels and is axially shiftable relative to the wheels.

6. The apparatus of claim 5, wherein said wheel means comprises a pair of steerable wheels and a pair of drive wheels mounted on said mechanism, and said control member is a shift lever connected between said steerable pair of wheels and said centrifugal device for controlling the direction of movement of said mechanism along said surface upon the operation of said centrifugal device.

7. The apparatus of claim 6, wherein said pair of drive wheels is rotatably supported on a shaft extended across said stationary frame.

8. The apparatus of claim 5, wherein said pair of differentially rotatable wheels is independently mounted on said stationary frame.

9. The apparatus of claim 5, including a chassis having a stationary frame and a floating supporting frame pivotally mounted on said stationary frame; said motor, said centrifugal device and said driving shaft being mounted on said floating supporting frame, said driving wheels being driven by said shaft upon rotation of said centrifugal device; main drive shaft and a extending from said motor and extending across said floating supporting frame, said centrifugal device being operatively arranged on one end of said main drive shaft for driving said rotatable wheels in accordance with the direction of rotation of said main drive shaft.

10. The apparatus of claim 9, wherein said floating supporting frame is pivotally supported on said stationary frame above said rotatable wheels, whereby said driving shaft is in peripheral contact with said rotatable wheels, said floating supporting frame including a pair of stops spaced apart from each other and projecting above said stationary frame to limit the lateral relative movement of said stationary frame to said floating supporting frame when said centrifugal device is driven by said motor.

11. The apparatus of claim 9, wherein said centrifugal device comprises:
   a movable member slidably arranged on said motor drive shaft;
   drive means carried by said movable member in operatively engagement with said driving shaft for driving the same;
   a stationary member fixed on said motor drive shaft and spaced apart from said movable member; and
   linkage means extended between said members for axially shifting said movable member along said motor drive shaft toward said stationary member when said motor is energized.

12. The apparatus of claim 11, wherein said drive means comprises a gear sleeve having annular flanges at opposite ends thereof, said driving shaft carrying a driven gear in meshing engagement with said gear sleeve and one portion of said gear sleeve being arranged between said annular flanges and shiftable axially through said annular flanges in an operative condition of said motor for driving said rotatable wheels along said surface in response to the direction of rotation of said motor.

13. The apparatus of claim 11, wherein said linkage means comprises at least a pair of link levers having inner and outer ends respectively, said inner ends being articulated between each other and said outer ends being articulated more to said movable member toward said stationary member, upon rotation of said motor.

14. The system as defined in claim 13, wherein said linkage means includes two pairs of link levers arranged at both sides of said motor drive shaft and operatively articulated to said movable and stationary members, a compression spring mounted on said motor drive shaft between said movable and stationary members to maintain the same spaced apart from each other in an inoperative condition of said motor, and a traction spring extended across said motor drive shaft and operatively connected to each of said pairs of link levers for pulling said levers inwardly during the inoperative condition of said motor.

15. The apparatus of claim 1, wherein said wipers comprise four discs.

16. The apparatus of claim 15, wherein three of said wipers are located at the vertexes of an equilateral triangle and the other at the center of said triangle, said wipers each having a diameter less than the spacing between two adjacent conductors and the distance between adjacent discs being less than said spacing.

17. The apparatus of claim 15, wherein said discs are spring-loadedly mounted on a stationary frame provided in said mechanism for establishing an electrical contact with said conductors.

18. The apparatus of claim 17, wherein said stationary frame has four openings, each of said discs having a shaft portion slidably received in each of said openings and substantially protruding above said stationary frame and a compression spring mounted on said shaft portion between said stationary frame and said disc for urging said disc against said surface.

19. The apparatus in claim 18, wherein at least two disc ends of said shaft portion are electrical terminals electrically connected to said current supply source through two parallel conductors of different polarity.

20. The apparatus of claim 1, wherein said surface is a plate having an upper face comprising electrically insulating material, said conductors being metal strips embedded in said plate and having edges projecting slightly above said face.

21. The apparatus of claim 1, including a twin bridge between said wipers and said motor.

22. The apparatus of claim 21, including a relay having contacts in circuit with said motor for reversing the polarity thereof.

23. The apparatus of claim 22 including a calibrating resistor in series with relay a coil.

24. The apparatus of claim 1, including two mechanisms on said surface, each having a motor, one of said mechanisms having a D-C blocking network in circuit with its motor and the other of said mechanism having an A-C blocking circuit with its motor, said current supply source applying to said conductors, a current having a controllable D-C component and a controllable A-C component.

25. An apparatus for controlling the direction of movement of a mechanism on a surface comprising:
a plurality of substantially parallel conductors on said surface alternately connected to opposite terminals for connection to a current supply source;
a plurality of wipers comprising four discs on said mechanism, at least two of said wipers being in contact with a pair of said conductors connected to said opposite terminals; and
means energizable through said wipers to propel said mechanism across the surface.

26. An apparatus according to claim 25 for controlling the direction of movement of a mechanism on a surface comprising:
a plurality of substantially parallel conductors on said surface alternately connected to opposite terminals for connection to a current supply source;
a plurality of wipers comprising four discs on said mechanism, at least two of said discs being in contact with a pair of said conductors connected to said opposite terminals, three of said discs being located at the vertexes of an equilateral triangle and the other of said discs being located at the center of said triangle, said discs each having a diameter less than the spacing between two adjacent conductors and the distance between adjacent discs being less than said spacing.

27. The apparatus of claim 25, wherein said discs are spring-loadedly mounted on a stationary frame provided in said mechanism for establishing an electrical contact with said conductors.

28. The apparatus of claim 27, wherein said stationary frame has four openings, each of said discs having a shaft portion slidably received in each of said openings and substantially protruding above said stationary frame and a compression spring mounted on said shaft portion between said stationary frame and each said disc for urging said disc against said surface.

29. The apparatus of claim 28, wherein at least two disc ends of said shaft portion are electrical terminals electrically connected to said current supply source through two parallel conductors of different polarity.

* * * * *